United States Patent Office

3,391,393
Patented July 2, 1968

3,391,393
CONTROLLERS
Howard R. Jaquith, Rochester, and Harry Stultz and John J. Callahan, Chili, N.Y., assignors to Taylor Instrument Companies, Rochester, N.Y., a corporation of New York
Filed Oct. 11, 1965, Ser. No. 494,837
26 Claims. (Cl. 340—172.5)

ABSTRACT OF THE DISCLOSURE

A program controller has two cylindrical drums and a counter. Each drum has longitudinal rows of cams thereon. Each cam row on the one drum provides an overall profile that actuates readout elements which in turn actuate devices to be controlled. Each cam row on the other drum provides an overall profile representing the time interval for actuation of the control devices in accordance with the first mentioned profile. The counter provides an overall cam profile representing its count, which in turn represents time elapsed. The last two profiles' representations of time interval are read out by readout elements that cause a motor to turn both drums when said last two profiles express the same time interval, and the counter to reset. The two drums now provide the readout elements with new cam profiles. The time-representing profiles express time in a binary code, one such profile, hovewer, being complementary to the other when both represent the same time interval. Occurrence of complementation eventuates in a series of switches being in the on state to complete a control circuit for causing the drums to move as described and the counter to reset.

---

This invention relates to improvements in controllers for automatically controlling apparatus, the basic operation of which involves performance of various functions in a predetermined sequence. Such sequence corresponds to a set of instructions or a program that might be given to a human being to permit him to exercise direct control of the apparatus by manipulating various levers, buttons, or the like from time to time, at specified times and/or upon occurrence of certain events from time to time, thereby carrying out the successive phases of the program.

Control of this sort is known as program control and, in a wide variety of cases where the sequence of manipulations and the precise times at which they are to occur are both given, as time-program control. U.S. Letters Patent 2,438,724 to Sutherland and U.S. Letters Patent 2,472,970 to Hanna represent but a small portion of the prior art relating to time-program controllers and/or to practical applications thereof. The controller, according to the present invention, likewise is particularly adapted for time-program control, but follows a somewhat different type of construction, involving improvements the utility of which is not restricted to time-program control.

In brief, a controller according to the invention includes a pair of stepwise-rotatable drums, the one, the function drum, incorporating the equivalent of the aforesaid set of instructions, the other, the time drum, incorporating, in effect, a schedule of the times at which individual instructions are to be carried out. Execution of the instructions takes the form of opening and closing valves and/or switches. While the valves and/or switches might be those that would be used by a human operator in manually operating the apparatus under control, said valves and/or switches are structurally integrated in the controller and may act simply as relay-devices which may be used to actuate valves, switches, or other devices, normally integrated structurally with the apparatus under control, or at least, provided externally of the controller and structurally independent thereof.

The aforesaid schedule specifies the times at which the said function drum is to execute a step of rotation, the function drum being constructed and arranged so that at each step, those of said switches and/or valves are opened and closed as is appropriate at the time such step occurs. As this function drum incorporates the program for the exercise of the various functions of the apparatus under control, it may also be termed the function program drum.

The said time drum operates to rotate the program drum a step at appropriate times. As this drum provides a time program, or sets a schedule of times for the function program, it may also be termed a time program or time setting drum. For time-program control, these times are known before hand, hence a time-generator, a clock, in effect, is also provided to tell the time drum when the right time for the step occurs. Such information is provided by the setting of two groups of switches, one group being set by the time drum and the other group by the time generator.

Each step of the time drum sets said one group of switches into a configuration of on and off corresponding to the time at which the next step is to occur. At the beginning of each step, the time-generator counts time, and in the process of doing so, causes the said other group of switches to assume an on-off configuration that at substantially any instant tells the time drum the time, so to speak. Actually, the latter said configuration represents time elapsed since the beginning of a step of the time drum, whereas at the beginning of this last said step, the time drum sets up an on-off configuration of the said one group of switches that represents how much time is to elapse before the next step occurs.

Both groups of switches are incorporated in a circuit of such sort that when said other group of switches is caused by the time-generator to achieve a configuration corresponding to the elapsed time represented by the configuration of said one group of switches, both said drums execute a step.

Both said drums provide for setting up a variety of instructions and times thereon, and it will be noted that the operation is basically binary-digital in nature, i.e., switches and the like are being opened and closed. Time settings, however, are normally given in decimal form, and are generally of such magnitude as to be quite cumbersome to express in binary form. As the controller is intended to be operated under the general supervision of a human operative not versed in such matters as binary arithmetic, a controller according to the present invention provides for setting the times on the time drum in ordinary decimal terms by means of linearly movable cams whose profiles determine the on-off configuration of the said one group of switches. These cams, in effect, automatically convert decimal time settings to binary time settings, and are arranged around the periphery of the time drum. Each time the time drum rotates a step, a new set of cams acts on the said one group of switches to establish thereby a binary representation of some predetermined time interval.

The time-generator is basically a conventional rotation counter having number wheels calibrated in and geared for motion in decimal quantities. In addition, however, cams operated by the number wheels are provided which cause the said other group of switches to assume on-off configurations binarily representative of the decimal reading of the said number wheels.

According to the invention, both said groups of switches are so constructed and arranged that if either set of cams causes all of the corresponding group of switches to be closed, the said drums rotate a step. This is caused to come about by completion of the aforesaid circuit through the last said group of switches. Further, the said circuit is designed such that it can be completed when enough switches in each of the groups are closed, and the aforesaid cams are so profiled that given a particular setting of the said one group of switches, no setting of the other said groups will have enough close switches except when just so much time elapses as corresponds to said particular setting. As will be seen later, this involves profiling of the time-generator's cams in accordance with a binary code for decimal digits, and profiling the cams of said other drum in accordance with the same binary code in its complementary form. Each time the drums step, the time-generator's cams and number wheels reset to zero, hence the settings of the time drum's cams represent the time intervals between successive drum steps.

The controller naturally includes various instrumentalities, such as a constant-speed motor for driving the time-generator, motor means for stepping the drums, reset means for resetting the time-generator to zero, and various switches or equivalent for coordinating the elements of the controller, as thus far described.

Certain objects of the invention will be evident from the foregoing brief description, and others from the detailed description hereinafter. However, it is intended that the nature and scope of the invention be taken as controlled by the claims appended hereto, and that the present disslosure, outside of the claims, be taken as exemplary rather than limitative.

Figure 1:
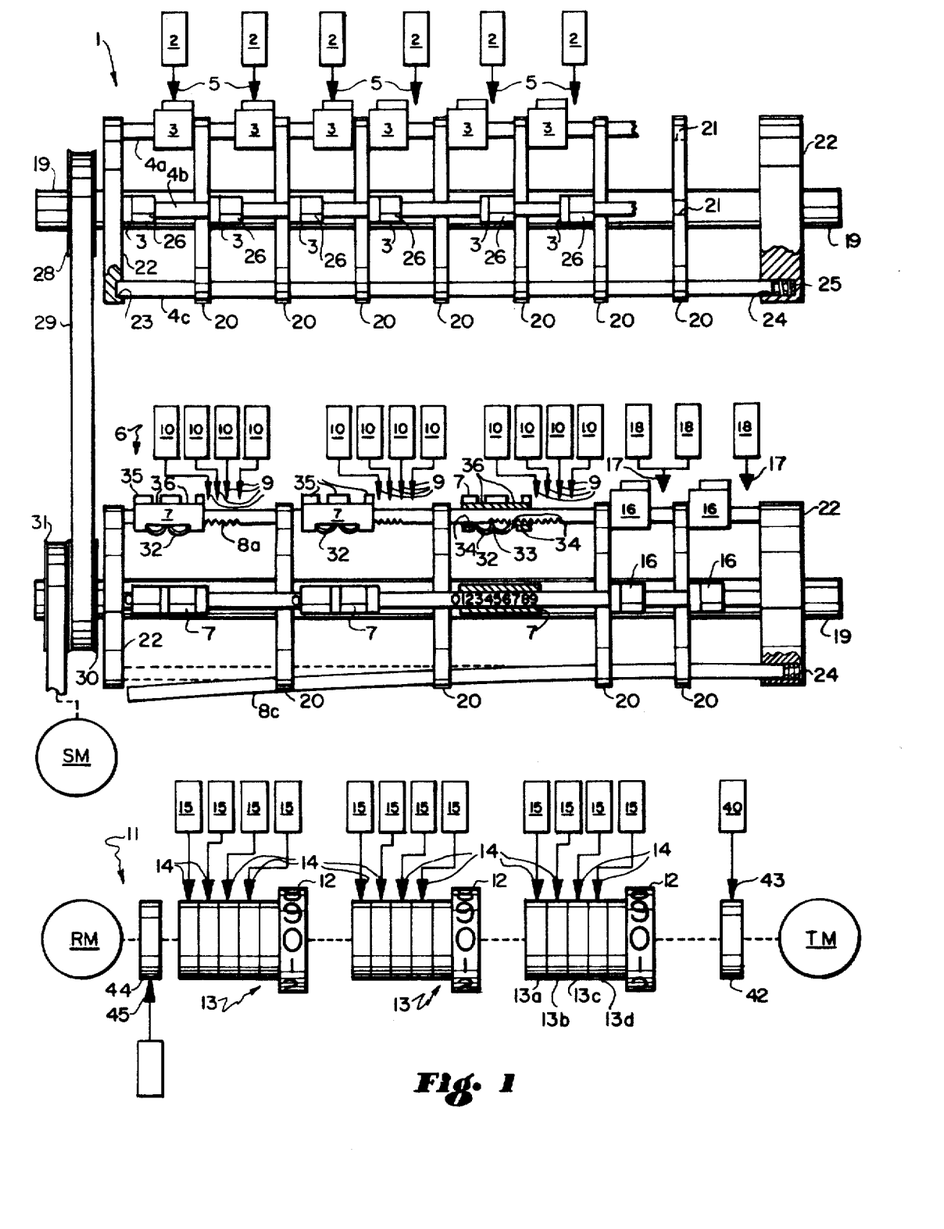
FIGURE 1 is a partly schematic plan view of the controller according to the invention.

In FIGURE 1, function program drum 1 operates devices 2 by means of cams 3 projecting from the periphery of the drum and slidably mounted on bars 4 which define the periphery of drum 1. Each of the cams 3 can be set either to a position where it will deflect an element 5 of one of the devices 2, or to a position where it cannot, for the devices 2 are arranged close enough to the periphery of the drum that if the drum rotates and a cam 3 passes directly under a device 2, the last said cam will strike the element 5 of the last said device 2. On the other hand, if cam 3 is positioned so that it is directly under the space between a next-adjacent pair of devices 2, it will pass between the corresponding elements 5 without touching them. Devices 2 are arranged with their elements 5 alined in a row parallel to the axis of rotation of drum 1 and to the bars 4 thereof.

Devices 2, in practice, would commonly be mercury switches, micro switches, pilot valves or other control devices, or some combination of several kinds of control devices. The nature of devices 2 are of no concern to the present invention, for they are not involved in the internal operation of the controller, but rather confine themselves to beginning, ending, maintaining, or otherwise controlling performance by external apparatus (not shown) of various functions or effects peculiar to said external apparatus.

Function drum 1 is shown in a position wherein the bar 4a is directly under devices 2, so that each of the illustrated cams 3 of this bar, but three, is deflecting the corresponding element 5 of a device 2. Therefore, the external apparatus controlled by devices 3 of bar 4a is in a corresponding state of operation, i.e., a given phase of a program for the exercise of the functions of said external apparatus is in effect.

After a given time interval has expired, some aspect of the program phase corresponding to the positional configuration of the cams 3 on bar 4a must be changed. Hence, at the end of said interval, drum 1 is to be rotated such that the cams 3 of bar 4b replace those of bars 4a. While FIGURES 1 suggests a drastic change in the operation of the said external apparatus (only one of the cams of bar 4b is in the position on bar 4b that corresponds to the position on bar 4a of the corresponding cam of bar 4a), such change need not involve more than a change in the condition of but one of devices 2. In fact, it is conceivable that a mere repetition may be in order.

In any event, the presentation of the cams of bar 4b to element 5 of control devices 2 marks the beginning of what amounts to a second phase of the control program. After the expiration of a second given time interval, this second phase is succeeded by a third phase corresponding to the configuration of cams 3 (not shown) of bar 4c. Although FIGURE 1 is drawn such to suggest a program of but four phases corresponding to bars 4a, 4b, 4c and one on the opposite side of drum 1, but not visible in the view of FIGURE 1, in practice there would likely be many more bars 4, much closer together than indicated in FIGURE 1, not only for the purpose of accommodating a more complex program on drum 1, but to simplify actuation of devices 2, since if the bars are close enough together, any device 2 can be actuated substantially uninterruptedly so long as the corresponding cams 3 on next-adjacent bars are in position for deflecting the element 5 of the last said device 2, i.e., the last said element 5 remains more or less continuously deflected, in effect, till a bar comes along having the corresponding cam 3 positioned so that it cannot maintain deflection of said last said element 5.

The phases of the program last for intervals of time determined by time drum 6. Like function drum 1, drum 6 provides cams, bars, elements and devices. The cams 7 of time drum 6, however, are profiled as shown, and each thereof has ten possible positions along the length of a bar 8 of time drum 6. The elements 9 and devices 10 correspond respectively to elements 5 and devices 2, and are alined so as to be actuated by the cams 7 of a particular bar 8 in a manner analogous to which elements 5 and devices 2 are actuated by cams 3 of a bar 4. However, the devices 10 define three groups, each of which has four elements 9 located so that the position along a bar 8 of the corresponding cam 7 determines which, if any, of the last said elements 9 are deflected and which thereof, if any, are not deflected. Thus, a notch of a cam 7 presented to an element 9 will receive the last said element without deflecting it, whereas a lobe of the last said cam, if presented to the last said element, would deflect it.

The lobes, notches and positions of a cam 7, and the spacing of the corresponding group of four elements 9, and the position thereof with respect to the last said cam 7, are so designed that each of said positions provides a unique configuration of the last said elements 9, in terms of deflected and non-deflected states thereof. One of these states is given the significance zero, and the other, unity. Thus, giving the non-deflected states the significance of unity, then, as shown, the configuration of each switch group is 1111. Moreover, it will be evident that if one of cams 7 of the bar 8a is moved to the right, say just far enough to present the rightmost lobe of the last said cam to the leftmost one of the corresponding group of elements 9, then the configuration of the last said group signifies 0111 (or 1110, since the configuration can be read from left to right or from right to left, provided one of these conventions is consistently adhered to).

The configuration of the groups of elements 9, therefore are representations of four-digit binary numbers. Moreover, as each of cams 7 has ten positions, there are ten such representations, each different from the other and, accordingly, these representations can be assigned significance as decimal digits, namely 1111 is 0, 0111 is 1, and so on. The three groups of elements 9 therefore can represent a three-digit decimal number in a binary code.

In general, the cams 7 on bar 8a would be set, not to 000 (represented by the binary code representation 1111, 1111, 1111) as illustrated, but to some non-zero signifying position such as 009, 107, 314 or the like, representing decimally as many units of time (days, hours, minutes, decimal fractions of minutes, or the like). That is, the phase of the control program represented by cams 3 on a bar 4, when the latter's cams are presented to elements 5, is to last for the length of time signified by the setting of cams 7 on a bar 8. As will be seen later, both sets of cams are presented to the corresponding sets of elements simultaneously. Thus, it is to be supposed that both of drums 1 and 6 have rotated so that the cams 3 and 7 of bars 4a and 8a have deflected whatever elements 2 and 9 they can deflect at the same instant and are maintaining such deflection, and that one or more of cams 7 of bar 8a are set, not as illustrated, but to some positions wherein the binary representation of the groups signifies a number of time units greater than zero.

As the purpose of setting cams 7 on bar 8a is to determine the length of time of the program phase effected by cams 3 of bar 4a, it is necessary to provide some means for generating time, so to speak.

Accordingly, a time-generator 11 is provided to generate binary representations of actual time elapsed. Generator 11 is basically in the form of a conventional decimal counter having indicating drums 12, each graduated as shown with the decimal digits 0 through 9, and transfer mechanism (not shown) for transferring rotation of one drum to the next in decade fashion. Also, a timing motor TM is provided that rotates the rightmost drum 12 at a uniform rate, say once a minute. Accordingly, the said transfer mechanism will be arranged to cause the last said drum 12 to rotate the center drum once every ten minutes, and the center drum, in turn, to rotate the leftmost drum once every 100 minutes. Preferably, said transfer mechanism is in the form of the usual Geneva gearing, mutilated gearing, or the like, so that at least the leftmost and center drums rotate stepwise, i.e., one complete turn of the rightmost drum causes the center drum to rotate one-tenth of a turn at about the instant said rightmost drum completes one full turn, and so on. It is evident that supposing the drums 12 to indicate 000, as shown, continuous revolution of the motor TM for 100.0 minutes will cause the counter wheels to give successive indications 001, 002, . . . 993, 999, 000, signifying 0.1, 0.2 . . . 99.8, 100.0 minutes.

In addition to this typical prior art counting action, and unlike the usual counter, each of the wheels 12 has a leftward-extending portion comprising four side by side coaxially-mounted cams 13. In position to be actuated by lobes (not shown in FIGURE 1) of these cams, are the actuating elements 14 of devices 15. Functionally, elements 14 and devices 15 are equivalent, respectively, to elements 7 and devices 10 and, moreover, have an analogous grouping, with respect to cams 13. However, since each group of cams 13 rotates in unison with the corresponding counter wheel 12, the configuration of non-deflection and deflection of each group of cams 13 changes periodically. As will be described later, the overall profile of each group of cams 13 is such that one rotation of the corresponding wheel 12 causes the last said group to produce ten configurations of the corresponding groups of elements 14, each of said configurations being different from the others thereof.

These configurations have the significance of four-digit binary numbers, each of which latter, in turn, signify one of the digits 0 through 9, as in the case of the groups of devices 10. Accordingly, the total configuration of all the elements 14 signifies a three-digit decimal number corresponding to a time interval of as many tenths of a minute.

Counting time from 0.0 begins at substantially the same instant bars 4a and 8a present their cams to devices 2 and 10. Devices 2, so to speak, now read out the cam configuration on bar 4a and tell some external apparatus (not shown) what to do; devices 10 read out, from cams 7 of bar 8a, a binary representation of how much time is to elapse before the cams 7 of bar 4b are presented to elements 5 for readout by devices 2; and devices 15 read out, from cams 13, the time elapsed since 0.0. Devices 10 and 15 are therefore so constructed and arranged that when the elapsed time readout by devices 15 is the same as that read out by devices 10, drums 1 and 6 each simultaneously step once, that is, bars 4b and 8b move so that their cams are positioned to be read out, instead of the cams of bars 4a and 8a.

As may be imagined, the cams 7 of bar 8b have been set to such positions that devices 10 now read out the binary representation of the time interval during which the new phase of the control program, namely, the program phase which is read out by devices 2 from the cams of bar 4b, is to last. Accordingly, a motor RM now resets the time-generator to 0.0 (in practice, to a small, non-zero time count that allows for the time taken by resetting and stepping, during which time generator 11 is not counting). In effect, zero time for the new phase causes generator 11 to start generating time from that point, at the same instant that devices 2 and 10 begin to read out the cams of the bars 4b and 8b, respectively.

In general, there will be as many bars 4 as bars 8, and in fact, as the drums 1 and 6 move in unison, they could be combined into one single drum. However, as it is commonly the practice to provide an even larger number of devices 2 than shown, a single drum is likely to be rather more unwieldy and heavy than is desirable from the point of view of compactness, structural stability and like considerations.

Again, resetting time-generator 11 to 0.0 for each program phase could be dispensed with, provided no program lasting longer than 100.0 minutes is to be utilized. Thus, for four 20 minute phases, with reset of generator 11, the cams 7 would be set 200, 200, 200 and 200, on each bar 8. Without reset, the setting would be 200, 400, 600, 800. However, with resetting, the total program time available is equal, in general, to the number of bars 8 multiplied by the maximum count of the time-generator, i.e., about 400 minutes.

According to the invention, the devices 10 and 15 are arranged together so as to cause drums 1 and 6 to step when a relationship of complementarity exists between the readout of generator 11 and the readout of drum 6. Devices 10 and 15, of course, reflect the configurations of their respective elements 6 and 14. Each device 10 and each device 15 is therefore chosen to be a simple on-off switch, the arrangement being as shown in FIGURE 2.

Figure 2:
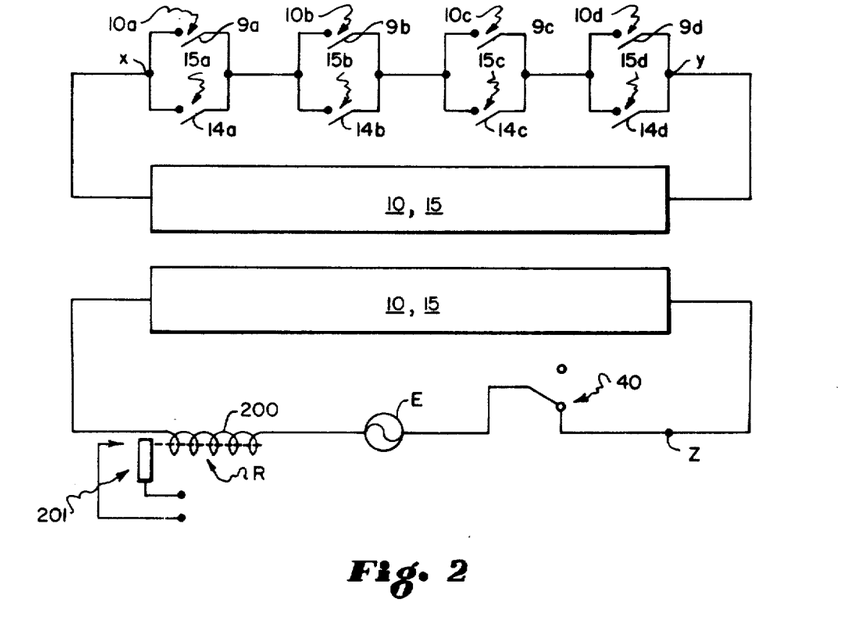
FIGURE 2 is a diagram of electrical circuitry interconnecting portions of the controller shown in FIGURE 1.

At the top of FIGURE 2, the reference numerals 10a, 10b, 10c and 10d, represent four devices 10, in the form of switches, from left to right, as they appear in FIGURE 1. Likewise, reference numerals 15a, 15b, 15c and 15d, represent four devices 15 in the form of switches, from left to right, as they appear in FIGURE 1. In both cases, it is to be considered that it is the leftmost group of four, thus illustrated. The respective elements 9 and 14 of the devices 10 and 15 are represented by switch contact arms 9a, 9b, 9c, 9d, 14a, 14b, 14c and 14d. In practice, of course, an element 9 (or 14) may include a mechanical movement which is actuated by the corresponding cam and which, in turn, actuates the corresponding switch contact arm.

Instead of illustrating the center groups of devices 10 and 15, and the rightmost groups thereof, these are represented by boxes labeled 10, 15, because the arrangement (except for switch settings) of the center groups would be identical to that shown for the leftmost groups, and likewise as to the rightmost groups.

Each of the contact arms 9a et al. and 14a et al. when moved up, closes the switch it forms part of, and when moved down from closed position, opens said switch. Taking the lines of the switch illustration to represent electrical conductors, and the dots, terminals then it is evident that there are a number of ways of completing the electrical path through the switches. In fact, there are many more than ten possible combinations of closed switches, taken less than all eight at time, that will establish a continuous DC path between terminals $x$ and $y$. The same may be said, of course, for the switch arrays represented by boxes 10, 15, and follows that a continuous DC path can be established on this basis between terminals $x$ and $z$, via the three switch arrays.

Also, connected between terminals $x$ and $z$ are a source E of electrical energy, and a relay R. Relay R has its winding arranged to be traversed by the current from said source and, in response, closes a pair of its electrical contacts, the arrangement being that current flows through said winding, only when the electrical path through the switch arrays is completed.

Each switch array is of a complementary nature, i.e., the switches are paired off 10a and 15a, 10b and 15b, 10c and 15c, 10d and 15d, insofar as the illustrated array is concerned, and in exactly similar fashion in the arrays represented by boxes 10, 15. As long as at least one switch in each and every such pair is closed, current flows through the winding of relay R, whereas if both switches of any such pair are open, such current does not flow. If the open condition of a switch signifies zero and its closed condition unity, or vice versa, then the total configuration of the three switch arrays can be written as a decimal number of three digits, each such digit corresponding to a four-digit binary number describing the on-off configuration of one of said arrays.

For purposes of explanation, suppose that switches 10a, 10b, 10c and 10d are normally closed, that is, the elements 10 and the last said switches are constructed and arranged so that deflection of elements 10 by cams 7 opens said last said switches.

Thus, positioning the leftmost cam 7 of bar 8a to a position wherein it could open, say, only switch 10b, of FIGURE 2, and positioning the other cams 7 of bar 8a so as to establish other configurations of the switches of the other two arrays, consequently, then, the switches' configuration would be a binary representation of the setting of cams 7, reading, say, from left to right, "1011, 0101, 1001."

The binary representation "0100, 1010, 0110" is the complement of the first said representation, in that it has unity and zero wherever the said first said representation has, respectively, zero and unity. Obviously, the leftmost four-digit binary number of the second representation can be obtained by opening all of switches 15a, 15b, 15c and 15d, except switch 15b. Since switch 10b is open, the circuit from terminal $x$ to terminal $y$ is nevertheless complete. In like manner, appropriate switches in the other two arrays of devices 15 can be closed to get the other two binary numbers of the said second description. Therefore, each cam 7 is profiled and settable so as to provide for causing the corresponding array of devices 10 to provide 10 different binary representations defined by on-off switch configurations, and each group of cams 13 is profiled and settable to provide for causing the corresponding array of devices 15 to provide the complements of said representations, cams 7 being set by hand and cams 13 being set by the counter wheels of the time-generator 11, which is driven by motor TM whereby the representations due to cams 13 change at a uniform rate with time.

The cams 7 are intended for manual setting by persons unfamiliar with binary arithmetic. Also, it is necessary to choose (from the numerous codes that seemingly could be provided by the profiles of cams 7 and 13) just such a code, as will lead to the simplest cam profiles and to the least mechanical complexity in setting the cams, and as will also suit the complementation circuitry of FIGURE 2. A novel unique code of this character is provided by the present invention, and the principles involved are set forth in tabular form in FIGURE 3.

Figure 3:
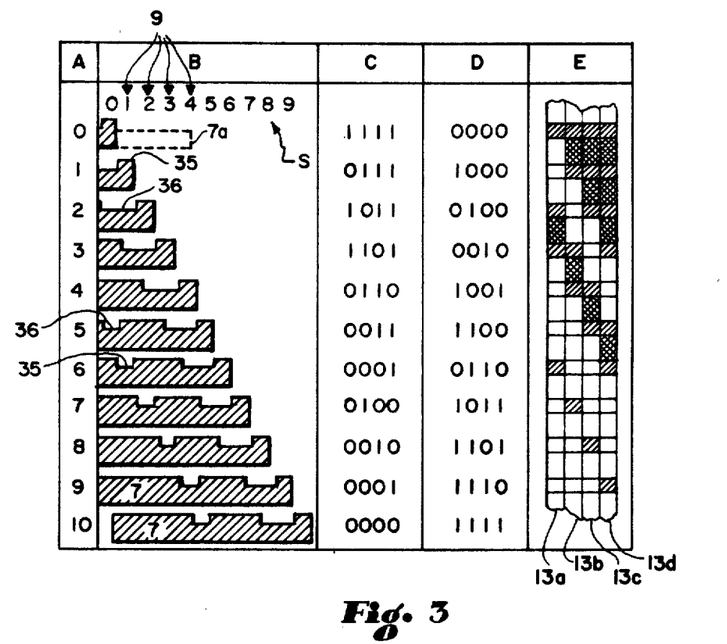
FIGURE 3 is a tabular representation of coding and cam profiling involved in the operation of the controller shown in FIGURE 1.
Figure 4:
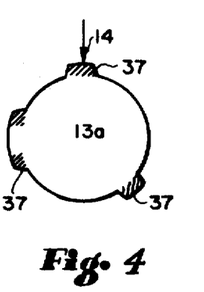
FIGURES 4 through 7 illustrate the profiles of rotary cams used in the controller shown in FIGURE 1.
Figure 5:
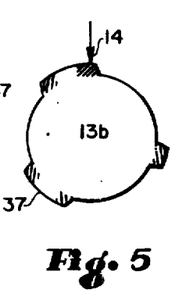
Figure 6:
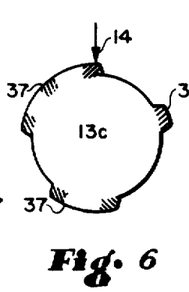
Figure 7:
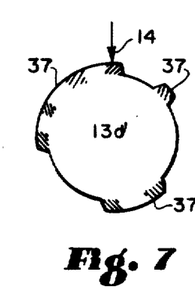

The various settings of cams 7 and 13 provide the profiles shown in FIGURE 3, wherein column A contains the setting or position number of cams 7 with respect to scales S on bars 8 (one such scale being illustrated in full on a cam for bar 8b of FIGURE 1) and also the decimal digit readout of cams 13 by a numeral wheel 12 for each of the positions of a group of four cams 13. Column B shows the profiles of cams 7 as those appear to the elements 9 in the said positions. Column E shows the profiles of cams 13 unwrapped and laid out flat, so to speak, as these profiles appear to elements 14 of devices 15, in the different angular positions of cams 13. Columns C and D list the respective binary significances of the cam profiles in their various positions, column C being for cams 7 and column D for cams 13. The cam lobes of cams 7 and 13 are portrayed as hatched areas, whereas cam notches fall in the clear areas between lobes. While the groups of cams 13 are shown as if broken down into four individual cams 13a through 13d, each group is constructed so that in practice, the individual cam profiles maintain the relative positions shown in column E, FIGURE 3, i.e., each said group is rotated as a unitary member by its corresponding number wheel 12.

Comparing column A with columns C and D shows that the binary counterparts of column A numbers are not simply conversions of the decimal digit to its arithmetical binary form. Nevertheless, the particular order in columns C and D is prescribed by the fact that thereby, the binary representations are given progressively by the profile of a cam 7. The profile of cam 7 begins, in effect, with a virtual notch four digits long (represented in dashed line at 7a, column B, in the zero row of FIGURE 3), which notch is followed by a one-digit or single lobe, followed by a two-digit or double notch, followed by a two-digit or double lobe, followed by a one-digit or single notch followed by a four-digit or quadruple lobe. In practice, cam 7 need not extend to the right for the sake of the four-digit notch 72.

With this basic notch and lobe proportioning, motion of a cam 7 one digit (i.e., a single notch or a single lobe) at a time generates the code of table C. This sort of code therefore provides for great simplicity, compactness and economy of construction in the case of time drum 6. Thus, setting cams 7 is very simple mechanically, a great number of them can be provided at small cost in space, and only a very simple linear scale, such as is shown at S, FIGURE 1, allows setting the cams 7 in plain decimal terms, without referring to any code chart, or the like.

Second, the code of tables C and D is not redundant. Looking at FIGURE 2, if switches 10a et al. are set to represent 0110, then any setting of switches 15a et al. which includes closing switches 15a and 15d, would complete the circuit via these switches from $x$ to $y$. Thus, 1001 and 1101 would each complement 0110 insofar as the switch array is concerned. According to the present invention, however, no term in table C is complemented, in this sense, by any term higher up than it is in column D (that is, signifying a *lower* decimal digit), and therefore no undesired complementation occurs.

The code of tables C and D is unique in the above-discussed respects, i.e., in its progressive nature as reflected in the profiles of cams 7 and in its unambiguous character with respect to the complementation-sensing character of the devices 10 and 15, as arranged in FIGURE 2.

The table of FIGURE 3 also shows, in column E, the relationship of the profiles of cam 13 to those of cams 7.

Comparing columns B and E reveals that in any horizontal row, the profiles of a cam 7 have notches and lobes where the net profile, horizontally-viewed, of the cams 13, have lobes and notches, respectively, i.e., they are complementary. Also, it is evident, in principle, that time drum 6 and time-generator 11 could be constructed to use rotary cams and linear cams, respectively. However, linear cams 7 better suit drum 6 than would rotary cams, and rotary cams 13 better suit the rotary counting action of time-generator 11 than would linear cams.

It is to be further noted that the complementation action of the switch arrays, as described above, implies that devices 10 and 15 are switches of the normally closed type, that is, one deflects an element 9 or 14 to open the corresponding switch, whereas if one releases the last said element, the last said switch automatically closes. However, all the switches could be normally open, so that elements 9 and 14 must be deflected to close them. In that case, the cams 7 would be profiled so as to have notches, where they now have lobes, and to have lobes where they now have notches, and the same with the cams 13. Again, the devices 10 could be normally closed switches and the devices 15 normally open switches, or vice versa. In the former case, profile column E would be the same as, not the complement of, profile of present column B, whereas in the latter case, profile column B would become the same as present profile column E.

Despite what has been said supra as to profile and possible variations thereof, the same basic code applies and practically no variation is possible therein. Thus, the code can be shifted vertically, so that its decimal significance is given by substracting one from each number of column A, namely, 0111 then represents zero, 1011 represents 1, 1101 represents 2, and so on. Such shift, however, does not substantially change the basic order or content of the original code.

In sum, as the code provides 11 four-digit binary numbers in immutable order, and since for the purpose of representing the decimal digits, the choice is as to whether to use the first ten or the last ten binary numbers, hardly a choice at all, the code for cams 7 and 13 is unique, that is, there is no different code (of four-digit binary numbers) that is simultaneously progressive with respect to cams 7 and unambiguous, hence, apparent modifications in the disclosed code, such as discussed above, are therefore not distinct from the particular application of the code made herein, as illustrated, to cams 7 and 13, and such modifications are intended to fall within the scope of the claims herein, notwithstanding any language therein that might appear to allow one such modification or another to escape the literal scope of such claims.

The occurrence of complementation is the key event in the operation of the controller, since this is the signal for drums 1 and 6 to step, for time-generator 11 to reset, and for various other actions to occur as may be necessary to the operation of the controller. However, apart from this, it will be observed that the arrangement of structure bringing about complementation is of wider utility in that it is basically a counter producing a useful output in response to the attainment of a predetermined count. In the present case, the count is considered to be of time, hence, such structure can be considered a timer. Moreover, one may count events, lengths and other entities to all manner of useful ends now known in the prior art. Clearly, the principles of the present invention have application to such ends, over and beyond the specific utility disclosed herein.

The bars 4 of drum 1 are angularly spaced around the shaft 19 of drum 1, supported thereon in notches 21 of a series of disks 20, and having as their loci, in effect, corresponding generators of a cylindrical shell whose radius is that of the disks 20 and whose axis is the axis of rotation of shaft 19.

Drums 1 and 6 are quite similar structurally, except as to the cams 7 of the latter, drum 6 also having, however, a set of cams 16 thereon cooperating with the elements 17 of devices 18, these entities corresponding to cams 3, elements 5 and devices 2, and having a particular purpose that will be described subsequently herein. In any event, for the most part, a description of drum 1 will suffice to describe drum 6.

As shown in FIGURE 1, bars 4, shaft 19 and disks 20 form an integral structure, except that provision is made for removing any given bar from the drum. Thus, in the case of bar 4c, the end disks 22 receive the ends of the bar 4c in holes 23 and 24, respectively, hole 24 being sufficiently deep that the bar 4a can be shifted along its locus far enough into hole 24 that the end of the bar in hole 23 comes completely out of hole 23, whereupon the last said bar can be lifted up far enough to clear disk 22 to allow the other end of the bar to be pulled out of hole 24. A compression spring 25 is provided in hole 24 which normally urges the bar 4c into hole 23, whereby the bar 4c being somewhat longer than the distance between the inner faces of disks 22, the bar 4c remains securely in place, except when being removed as aforesaid. Preferably, the free shape of the bars is somewhat curved (as shown in the case of bar 8c, FIGURE 1) so that it is necessary to bend the bar, a little, to the straight form (dashed line position of bar 8c) so as to make its end register with the adjacent hole 23 when its other end is deep enough in a hole 24 to allow the bar to clear the edge of the left-hand disk 22.

As is evident from FIGURE 1, the disks 20 provide fulcra for binding the bar 8c, that is, the bottoms of the notches 21 of disks 20 are so shaped and located as to be flush with the next adjacent side of the bar 8c when the latter is straight, is in the notches and has its ends in holes 23 and 24. As the bar 8c fits the notches more or less snugly, and as the bending stress in the bar causes the ends of the bar 8c to press against the sides of holes 23 and 24, in a direction radially outward from the axis of drum 6, bar 8c is substantially immobilized, without use of clamps, set screws, or the like. The bars 4 and 8, hence, can readily be removed or added without use of tools. The bars 4 should, of course, be made of a material, such as steel, that is both sturdy and can be bent the amount necessary without acquiring a permanent set or deformation thereby.

As suggested by FIGURE 1, a cam 3 has a flat inclined leading face 26 projecting far enough radially of the drum that it can strike an element 5 if the latter is otherwise in the path of the cam, and defect or lift it. The height of the element 5 is such that the normal direction of rotation of the drum (toward the eye of the viewer of FIGURE 1, and downward) causes the cam to contact the element at about the middle of the face 26. The direction of rotation and the orientation of the faces 26 could be opposite to that shown, of course.

Each bar 4 passes slidingly through its cams 3, which fit it closely except at the lower side of the bar where a leaf spring or like means (not shown) in each cam 3 presses against said lower side and the lower side of the aperture (not shown) in the cam through which the bar passes. Each cam is therefore frictionally held in play-free position on the bar, but can be slid by hand on the bar between the limits defined by the next-adjacent ones of disks 20.

The spacing of disks 20 on drum 1 is such that each cam has about twice its length of bar to slide upon before it contacts a disk. Each of elements 5, however, are more or less centered over one end-half of this bar length. Accordingly, as the drum 1 rotates, whether a given element will be struck by a cam 3 depends on there being a cam 3 located on the said one end-half of bar length. Cams 3 are therefore self-storing, for though a bar 4 may have as many cams thereon as there are elements 5, those cams that are not supposed to strike elements 3, when that bar goes under the element, are slid to the other end of the said bar length, where they will be out of the way when the bar 4 passes under elements 3.

Drum 1, of course, will have its shaft 19 rotatably journaled in otherwise fixed position, and suitable mechanism for driving it. For purposes of illustration only, we show just so much of such features as to relate the drum to the rest of the controller mechanism. Namely, one end of shaft 19 has a pulley 28 affixed thereto which is coupled by a belt 29 to a pulley 30 fixed on the end of another shaft 19 serving as a rotary support for drum 6, the last said shaft 19 also being rotatably mounted as in the case of the first said shaft 19. A pulley 31, fixed to said last said shaft 19, is driven by a stepping motor SM, whereby both drums rotate in unison.

The constructional characteristics of the cams 7 follow closely the principles of column B, FIGURE 3. Each cam 7 of drum 6 is a lobed and notched member mounted on a bar 8 much like a cam 3 is mounted on a bar 4, but including a spring 32 having a tooth-like portion 33 which fits into one of a plurality of notches 34 on the under side of bar 8. The sectional view of the cam 7 corresponding to the rightward group of devices 10 makes the arrangement of cam 7, spring 32 and notches 34 self-evident. There are 10 notches 34 dimensioned and spaced so that if a cam 10 is slid so that tooth-like portion 33 goes from one notch to the next, the cam 7 as a whole will move a predetermined distance along bar 8, and if it is slid again, so that portion 33 moves into still a third notch (the one next to the second-mentioned notch), cam 7 as a whole will have moved the same predetermined amount, and so on.

As the cam moves thus, so do its lobes 35 and notches 36. As shown, portion 33 is in the leftmost of notches 34. This puts a virtual notch of cam 7 in the path of four elements 9, that is the cam is in such axial position with respect to drum 6 that if the bar 4 is caused to pass under the four elements 9, cam 7 will clear these elements entirely. If each of the four elements 9 undeflected or unlifted, correspond to the zero state of its associated device 10, then these four devices 10 are producing the binary representation 1111. If, however, cam 7 is slid so that portion 33 slips into the notch next the leftmost one of notches 34, the smallest lobe 35 will occupy the same space as the leftmost element 9. Thus, with the cam in this position, and considering that deflection or lifting of an element 9 causes its associated device 10 to assume a state of "zero," therefore the four devices 10 will then produce the binary representation 0111.

It will be clear from the foregoing that the actions of cam 7 just described are those which produce the first two profiles of column B, FIGURE 3, and that by further moving the cam rightward, a notch at a time, the remaining profiles follow in the order given in column A, FIGURE 3. As there are ten notches 34, evidently each of the binary representations created can be interpreted as a description of one of the decimal digits 0 through 9. As there are three cams 7, each with its set of four devices 10, it is possible to set off any decimal number from 0 to 999 by means of the cams of a bar 8.

Preferably, the bars 8 are graduated on top as shown in the case of bar 8b (i.e., scale S), so that the numeral 0 is visible when the cam 7 is in the 1111 position, whereas the numeral 1 is visible in the 0111 position, numeral 2 is visible in the 1011 position, and so on, so that in the 0001 position all the numerals from 0 to 9, inclusive, are visible. This means, of course, that the numerals are spaced by the distance of a notch 34, though as a whole the series of numerals is displaced to the right from the series of notches 34. The numerals of scale S may be engraved on or stamped into the top surfaces of bars 8.

Each set of cams 13 of time-generator 11 consists, in effect, of the four rotary cams 13a, 13b, 13c and 13d, shown in FIGURES 4 through 7, and whose profiles correspond to those given in column E of FIGURE 3. Taking the profiles in FIGURES 4 through 7 clockwise corresponds to taking the profiles in column E from top to bottom. The reference characters 13a through 13d are applied to the profiles of column E, and to the rightmost set of cams 13, to indicate the correspondence between the cams of FIGURES 4 through 7, on the one hand, and the profiles of column E and the said rightmost set of cams 13, on the other hand. It will be seen from this that the counter wheels 12 count clockwise as viewed from the right and along the common axis of rotation thereof in the view of FIGURE 1.

The lobes of cams 13a through 13d are designated by reference numeral 37, in FIGURES 4 through 7, and correspond to the hatched portions of column E, FIGURE 3. The angular orientation of the lobes 37 is such, relative to the numbers on wheels 12, that the readout from the 0° point in FIGURES 4 through 7 is visually indicated by the numbers at 270° on the wheels 12, as shown in FIGURE 1, and corresponds to the binary number 0000 which signifies zero on the corresponding number wheel 12. This orientation is merely for mechanical convenience, in that in practice, an instrument is laid out as in FIGURE 1 in a relatively shallow housing which provides for viewing the wheels 12 in accordance with the view of FIGURE 1.

The profiles of cams 13, as shown, are partly due to the use of a particular method of manufacture, which is not of any concern here, but which results in some of the lobes 37 of cams 13 being longer than they actually need be. In column E, the hatched portions which correspond to lobes 37 are cross hatched at regions where a lobe is redundant, and in both FIGURE 3 and FIGURES 4 through 7, single-hatching identifies the effective parts of lobes 37. In short, the effective parts of the lobes of each cam group consist of some 22 portions of like angular extent, provided by a dozen lobes 37, some of larger extent than any of the said portions. In general, the angular extent of the lobes of cams 13 is immaterial if the redundant portions do not cause an undesired complementation, and the proper switches are closed long enough for complementation to make the switching arrays of FIGURE 2 respond to complementarity.

The coordination of drums 1 and 6, and generator 11 may be variously provided for. Here, devices 18, 40 and 41 (FIGURE 1), provide for such coordination. Device 40 is a normally-open switch, operated by a cam 42 which periodically deflects the sensing element 43 to close switch 40 for a brief time. Likewise, a cam 44 deflects the sensing element 45 to operate device 41.

Motor TM drives cam 42 to close switch 40 ten times for each full turn of the rightmost counter wheel 12, and from FIGURE 2 it will be seen that when a complementary configuration exists in the switch array, current flows through the array only when switch 40 is closed as shown in FIGURE 2. Conveniently, cam 42 is, in effect, a counter wheel, one revolution thereof turns the last said wheel 12 one-tenth of a revolution and, simultaneously closes switch 40 briefly.

Figure 8:
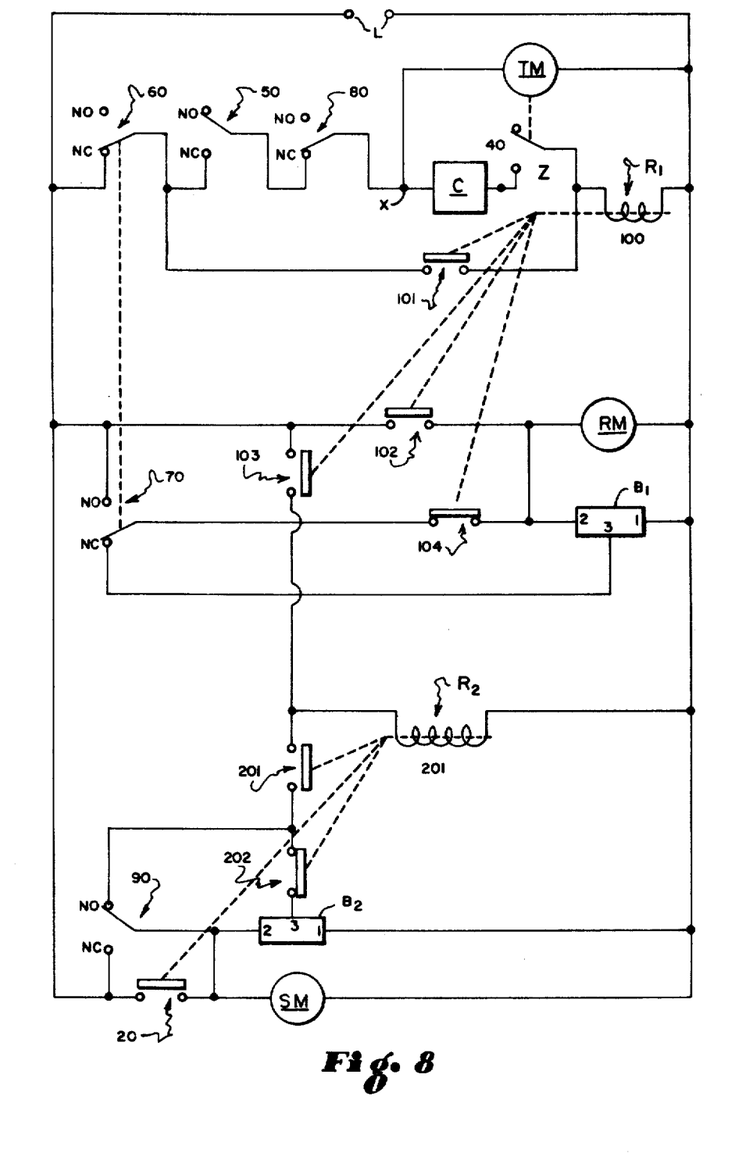
FIGURE 8 is a diagram of electrical circuitry which, along with circuitry according to FIGURE 2, supra, coordinates the operation of the several instrumentalities making up the controller shown in FIGURE 1.

FIGURE 8 shows one circuit for controlling the operation of the controller according to the invention. Taking the cams 7 of bar 8a and the cams 13 to be giving readouts signifying 0.0 minute, and letting box C, FIGURE 8, represent the entire complementation switch arrangement of FIGURE 2, then there will be a conductive path between terminals $x$ and $z$, which present the similarly designated terminals of FIGURE 2. Suppose, too, that the circuit of FIGURE 8 is connected by means of a pair of terminals L to a suitable source of power such as the usual AC mains, and that all the switches and contacts are in the states illustrated in FIGURE 8. Therefore, except that switches 40 and 50 are open, the winding 100 of a relay $R_1$ having contact sets 101, 102, 103 and 104 would be energized.

If the switch 50 be closed, AC power via closed switches 50, 60 and 80 energizes timer motor TM first and cam 43 begins to rotate and, in a fraction of a second or less, closes switch 40 momentarily, whereby relay winding 100 of a relay $R_1$ becomes energized. At this time, let switch 40 open again, thereby disconnecting the switch array C and timer motor TM from the AC mains. However, the relay $R_1$ is constructed so that energization thereof closes its contact sets 101, 102 and 103 (and opens set 104), so that winding 100 remains energized via now-closed contact set 101. Moreover, reset motor RM becomes energized via now-closed contact set 102, and also the winding 200 of a relay $R_2$ becomes energized via now-closed contact set 103. As relay $R_2$ is constructed so that energization thereof closes its contact sets 201 and 203 and opens its contact set 202, stepping motor SM becomes energized via now-closed contact set 203.

Operation of reset motor RM almost immediately causes cam 44 to operate device 40. Device 41, for the purpose of FIGURE 8, is chosen to be a multipole-multi-throw switch, or the like, corresponding to the two switches 60 and 70 shown, by dashed line, to be ganged together in FIGURE 8, to indicate that they are both actuated by cam 44. Motor RM is chosen to be a relatively high speed motor, and the resetting mechanism (not shown, but which is conventional) of the time-generator 11 is chosen so that it requires not more than two rotations of the wheels 12 to reset, although, in any event, the cam 44 is geared to the motor RM so as to rotate but once, suitable step-up gearing (not shown) being provided between cam 44 and generator 11 to transform the single turn of cam 44 to two turns or as much as be necessary.

Cam 44 is contoured so that through most of its rotation, it keeps switch 60 open and causes switch 70 to maintain a connection between its NO contact and the contact set 104. Switches 60 and 70, therefore, are always in the states shown in FIGURE 8 except for a period of time that begins shortly after rotation of cam 44 begins, and ends when the cam has completed one full turn.

Opening switch 60 obviously disconnects the winding 100 of relay $R_1$ from the AC mains, with the result that the contact sets 101, 102, 103 and 104 are restored to the states illustrated, i.e., all open except set 104 which now reverts to its closed condition. Reset motor continues to run since the closing of contact set 104 provides, with actuation of switch 70 to its NO contact, a current path around the now-open contacts 102.

Winding 200 of relay $R_2$ also remains energized, since the initial energization thereof gives it a connection to the AC mains via contact sets 201 and 203, and a switch 90, i.e., a connection which is equivalent to the original connection via contact set 103.

In the meantime, stepping motor SM has been turning drum 6, and eventually bar 8b presents its cams 7 to the elements 9. Assuming that some time interval has been set off on the last said cams, then the lefthand cam 16 of bar 8b will also have been previously set in its rightmost position, so that when bar 8b has replaced bar 8a at the readout point represented by elements 9, then the lefthand element 17 will be deflected by the last said cam 16, thus operating the two devices 18 operated by the said lefthand element 17. The said two devices 18 are represented in FIGURE 8 by switches 80 and 90, and the states illustrated for them in FIGURE 8 exists when their operating element 17 is deflected by the cam 16, whereas when it is not so deflected, switch 80 opens and switch 90 breaks the connection via which relay $R_2$ has been energized, and which replaced the original connection via contact set 103, after this last set reopened. However, breaking connection does not stop motor SM, for though contact set 203 reopens, switch 90 by-passes the contact set 203 via its NO contact until such time as switch 90 resumes the state shown.

The lefthand cam 16 of bar 8b eventually comes around far enough to deflect the corresponding element 17, thereby restoring switches 80 and 90 to the states shown. The motor SM therefore becomes deenergized, because contact set 203 is open and switch 90 no longer provides a current bypass around contact set 203.

The resetting time may or may not be longer than the step time. In practice, enough bars 8 are provided that one step of drum 6 may amount to as little as 10° to 15°, and may be completed in as little as 0.5 second, whereas resetting the generator 11 may take as long as 3 seconds. The circuit of FIGURE 8 does not depend, however, on one or the other of motors RM and SM finishing first.

In any event, suppose that cam 44 is still turning after motor SM has stopped, and eventually reaches the point where cam allows switches 60 and 70 to return to the states illustrated. Consequently, the connection to motor RM via contact set 104 and switch 70 is broken, and the motor SM is thereby deenergized. This means that cam 44 has made one revolution, whereby it results that time-generator 11 has reset to zero.

In practice, switch 50 represents the rightmost device 18, FIGURE 1. Accordingly, if it is desired that drum 7 step to bar 8c after the time set on the cams 7 of bar 8b has expired, the rightmost cam 16 of bar 8b must be in its righthand position, whereby when bar 8b arrives at the readout point, cam 16 closes switch 50. Switch 50, of course, stays closed till the complementation array C completes the circuit between terminals $x$ and $z$, and causes drum 6 to begin a step. At this point, the process described above repeats itself.

It will also be observed that if the circuit of FIGURE 8 had found lefthand cam 16 of bar 8b in the position illustrated in FIGURE 1, motor SM would continue to rotate drum 6 until such time as a bar 8 arrived at the readout point with a cam 16 positioned to actuate switch 90 to the position shown. Conversely, since switch 50 must close to start the stepping action, therefore each righthand cam 16 must be in its righthand position, except, of course, where the stopping is desired.

Figure 9:
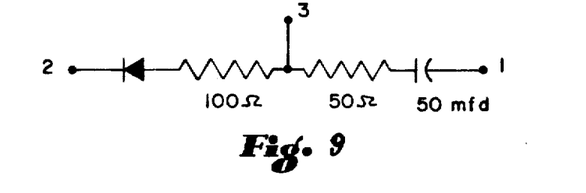
FIGURE 9 shows a detail of FIGURE 8.

As deenergization of motors RM and SM does not necessarily mean that they would cease rotation at the instant of deenergization braking circuits $B_1$ and $B_2$, each having terminals 1, 2 and 3, are provided as indicated in FIGURE 8. Braking circuits $B_1$ and $B_2$ are only effective when switches 70 and 90, and contact sets 104 and 202 are in the states shown in the drawing. Thus, whenever contact set 104 is open, and/or switch 70 breaks its connection with No. 3 terminal of the brake circuit, it is as if brake circuit $B_1$ does not exist. Likewise as to brake circuit $B_2$ and contact set 202 and switch 90. (A typical brake circuit is shown in FIGURE 9, which is self-explanatory.)

It will be seen from the description, supra, of the general operation of the circuit of FIGURE 8, that at no time when a motor is energized does a continuous connection exist between the No. 2 and No. 3 terminals of its brake circuit, whereas when the motor is deenergized, such continuous connection comes about, thereby braking the motor to an almost instant halt. The reason for operating switches 80 and 90 by one cam 16 is to assure that switch 80 opens before switch 90 by-passes contact set 203, and stays open till switch 90 goes back to its original state. Accordingly, the lefthand element 17 of FIGURE 1 represents a common operating mechanism for the two devices 18 (i.e., switches 80 and 90) which mechanism is constructed and arranged to activate devices 18 with the desired timing.

The program or function drum 1 operates in unison with time drum 6, so that each bar 4 comes to the readout point defined by elements 2, at the same time the corresponding bar 8 arrives at the readout point defined by elements 9.

One mode of utilizing the controller according to the invention, involves setting the cams 3 on bar 4a to their leftmost positions, cams 7 on bar 8a at their zero positions, and cams 16 on bar 4a at their rightmost positions, without, however, having the instrument connected to a source of power. Devices 2 would also be connected to the external apparatus to be controlled. In this instance, assume that in the undeflected positions of their elements 5 the devices 2 do not activate said external apparatus, whereas such activation follows when one, several, etc., of elements 5 are deflected.

Then, with the controller and the apparatus to be controlled in this inactive state, cams 3 on bar 4b are set so as to cause the first phase of the program, when the latter cams are read out, cam 3 on bar 4c are set for the second phase, and so on till all the phases of the program are set on bars 4. The time interval which each phase is to last is set on the corresponding bars 8 by means of cams 13, namely, first phase time interval, bar 8b, second phase time interval, bar 8c, and so on. Also, all the cams 16 on all such bars would be put in their rightmost positions. Rightmost cam 16 on the bar immediately following the bar whose cams 13 time the last phase, would be kept in its leftmost position, and the corresponding bar 4 would have all its cams 3 moved of the leftmost position.

To start the program, it is now merely necessary to connect the controller to the power for its circuitry (FIGURE 8). When this happens, the external apparatus is not immediately activated because the cams 3 of bar 4a are positioned in their leftmost positions. Cams 7 of bar 8a, however, are set for a time interval of 0.0 seconds, switch 50 is held closed by a cam 16, switches 60 and 80 are in their normally closed states, hence, as soon as timer motor TM closes switch 40, complementarity occurs, drums 1 and 6 step, and bars 4b and 8b present their cams to the readout points defined by elements 5 and 9. Thus, in a few tenths of a second after applying power, the first program phase begins under control of the cam settings on bars 4b and 8b. Moreover, the different phases of the program succeed one another as the drums 1 and 6 automatically step each of its sets of cams past its readout point in the proper order and at the proper intervals. Finally, the last bar 8 arrives, that is the one timing the last phase of the program, and when the cams of this last bar times out, the next bar 8 has the rightmost cam 16 in its leftmost position. Accordingly, when the last said bar 8 comes up it opens switch 50 and the controller can no longer continue stepping the drums 1 and 6. Moreover, this final step brings a bar 4 having each of its cams in the leftmost position (see above), so the external apparatus also stops.

The mode of use just described is but one of many that will be evident to one skilled in the art, and is given merely by way of example, as the utility of the present invention is not dependent on the particular mode of its use. For example, though the above-described program cycle begins with a null step, so to speak, in that bars 4a and 8a were not programmed to exercise control functions for a given time, it would be possible to so program the last said bars. Thus, an interlock type control over the external apparatus could be provided such that none of the functions controlled by devices 2 could be exercised till power was provided the controller.

Again, switch 50 has been treated as a normally-open switch, and each of bars 8 has been provided with a right-hand cam 16, for closing switch 50. However, if switch 50 is replaced by a normally-closed switch, arranged to be opened by the last said cam 16, then it is necessary to provide a right-hand cam 16 on only the bar or bars corresponding to the step at which the controller is stopped. In practice, only one such right-hand cam 16 would be provided, since a program can be started on any of the steps provided by the bars 4 and 8 that precede the bar having the last said cam thereon.

It is also evident that control of the stepping action is not restricted exclusively to time control, since the energization of relay $R_1$ can also be brought about independently of the switch arrangement C and pulse switch 40. For example, the external apparatus controlled could be provided with means responsive to the occurrence of some abnormal condition therein to cause the controller to go to the next program step before the time for it expired. Likewise, the operation of the generator 11 need not be in terms of time, but could be in terms of events, quantity, etc., produced, consumed, etc., at a variable rate. The settings of the time drum 6 would then be in terms of, say, quantities to be consumed, before one program phase succeeds another.

In the foregoing, the invention has been described with considerable particularity. However, those skilled in the art will note many changes, adaptations and uses that may be made that will fall within the scope of the claims appended hereto.

We claim:

1. A program controller comprising the combination of time program means, function program means, time generating means, and readout means;

said function program means being operable to sequentially provide first representations of the successive phases of a control function program, said time program means being operable to sequentially provide second representations of the successive time intervals for said phases, and said time generating means being operable to provide third representations of actual time elapsed since a given instant;

said combination including first readout means adapted to read out each of said first representations when it is provided, second readout means adapted to read out each of said second representations when it is provided, and third readout means adapted to read out each of said third representations when it is provided;

said combination also including operating means adapted to operate both said time program means and said function program means such that each said first representation provided by said function program means is provided simultaneously and only with a said second representation representative of the time interval appropriate to the control function program phase represented by the last said first representation;

said operating means being responsive to said second and third readout means simultaneously reading out second and third representations complementing each other to operate said time program means and said function program means as set forth in the next preceding paragraph, and such that upon complementation occurring, said operating means provides the next said first and second representations in the corresponding sequences;

said time program means and said time generating means each being constructed and arranged to provide its said representations in binary form in accordance with FIGURE 3 hereof, and such that the said second representations of said time intervals are the complements of the said third representations of the corresponding elapsed times.

2. A program controller comprising the combination of time program means, function program means, time generating means, and readout means;

said function program means being operable to sequentially provide first representations of the successive phases of a control function program, said time program means being operable to sequentially provide second representations of the successive time intervals for said phases, and said time generating means being operable to provide third representations of actual time elapsed since a given instant;

said combination including first readout means adapted to read out each of said first representations when it is provided, second readout means adapted to read out each of said second representations when it is provided, and third readout means adapted to read out each of said third representations when it is provided;

said combination also including operating means adapted to operate both said time program means and said function program means such that each said first representation provided by said function program means is provided simultaneously and only with a said second representation representative of the time interval appropriate to the control function program phase represented by the last said first representation;

said operating means being responsive to said second and third readout means simultaneously reading out second and third representations complementing each other to operate said time program means and said function program means as set forth in the next preceding paragraph, and such that upon complementation occurring, said operating means provides the next said first and second representations in the corresponding sequences;

each of said second and third readout means being an array of binary elements caused by readout of a corresponding said representation to have a binary configuration corresponding to the binary form of the last said representation and such that each of said elements provides a digit of said last said representation, both such arrays being constructed and arranged such that if each of said elements of either array provides the same binary digit, then said operating means responds as aforesaid; said arrays being integrated together such as to define a total configuration consisting of pairs of said elements corresponding to pairs of binary digits, each configuration of a said array providing one element of each pair, said operating means being responsive to the simultaneous provision by said elements of said given digit at least once in each said pair of said elements to operate as set forth in the next preceding paragraph.

3. The program controller of claim 2, wherein said representations and the corresponding configurations are given in accordance with FIGURE 3 hereof, and such that the said second representation of said time intervals are the complements of the said third representations of the corresponding elapsed times.

4. The program controller of claim 2, wherein each said element is an off-on switch, whereby each said array is a plurality of on-off switches, each such plurality defines the said configuration of each said array, each such plurality is equal in number to the other said plurality, each said pair includes switches from both said pluralities, each switch of such pair of switches is connected in parallel to the other switch thereof, each such pair of switches is connected in series with the other said pairs, whereby to define an electrical path having two possible states, one wherein in each pair at least one switch is in a given one of the conditions on and off, and one wherein in at least one pair both switches are in the other of said conditions on and off, and said operating means being responsive to occurrence of the first of said states to operate as set forth in the penultimate paragraph of claim 2.

5. The program controller of claim 4, said representations and configurations being in accordance with FIGURE 3 hereof.

6. A program controller comprising the combination of time program means, function program means, time generating means, and readout means;

said function program means being operable to sequentially provide first representations of the successive phases of a control function program, said time program means being operable to sequentially provide second representations of the successive time intervals for said phases, and said time generating means being operable to provide third representations of actual time elapsed since a given instant;

said combination including first readout means adapted to read out each of said first representations when it is provided, second readout means adapted to read out each of said second representations when it is provided, and third readout means adapted to read out each of said third representations when it is provided;

said combination also including operating means adapted to operate both said time program means and said function program means such that each said first representation provided by said function program means is provided simultaneously and only with a said second representation representative of the time interval appropriate to the control function program phase represented by the last said first representation;

said operating means being responsive to said second and third readout means simultaneously reading out second and third representations complementing each other to operate said time program means and said function program means as set forth in the next preceding paragraph, and such that upon complementation occurring, said operating means provides the next said first and second representations in the corresponding sequences;

said time generating means being a counter having a counting action in accordance with a number system having a base greater than the number 2, said counter having lobed and notched cams and being constructed and arranged to present said cams to said third readout means such that there is a different combination of lobes and notches for each count thereof;

motor means constructed and arranged to cause said counter to count at a fixed rate; said third readout means being constructed and arranged to read out each such different combination presented thereto and to convert same to the corresponding said third representation in binary form;

said time program means having lobed and notched cams providing its said second representations as a sequence of the last said cams, wherein such lobes and notches are arranged to provide profiles representing the times for said phases; said second readout means being constructed and arranged to read out the said profiles of the last said cams as provided by operation of said operating means and in binary form;

said profiles and said lobes and notches being formed as shown in FIGURE 3 hereof.

7. A program controller comprising the combination of time program means, function program means, time generating means, and readout means;

said function program means being operable to sequentially provide first representations of the successive phases of a control function program, said time program means being operable to sequentially provide second representations of the successive time intervals for said phases, and said time generating means being operable to provide third representations of actual time elapsed since a given instant;

said combination including first readout means adapted to read out each of said first representations when it is provided, second readout means adapted to read out each of said second representations when it is provided, and third readout means adapted to read out each of said third representations when it is provided;

said combination also including operating means adapted to operate both said time program means and said function program means such that each first representation provided by said function program means is provided simultaneously and only with a said second representation representative of the time interval appropriate to the control function program phase represented by the last said first representation;

said operating means being responsive to said second and third readout means simultaneously reading out second and third representations complementing each other to operate said time program means and said function program means as set forth in the next preceding paragraph, and such that upon complementation occurring, said operating means provides the next said first and second representations in the corresponding sequences;

said time program means and said time generating means each being constructed and arranged to provide its said representations in binary form, and such that the said second representations of said time intervals are the complements of the said third representations of the corresponding elapsed times;

one of said program means being in the form of a cylindrical drum mounted for rotation on its axis, and having its cylindrical surface constructed and arranged to be read out by the corresponding said readout means; the said surface being defined by rods parallel to said axis; each of said rods having means thereon providing the corresponding said representations, said drum including a pair of disks, each of said disks having holes therein receiving the ends of said rods, so as to provide a pair of holes one on each disk, each opening toward the other, and receiving the corresponding ends of the same one of said rods; one hole of each said pair having resilient means therein attempting to force the corresponding rod out of said one hole, the other said hole being not more deep than necessary to prevent the last said rod from being thus movable out of said one hole; but said one hole being sufficiently deep to allow the said last said rod to be forced therein, against the force of said resilient means, to sufficient extent that said last said rod moves completely out of said other hole.

8. The program controller of claim 7, wherein at least one other disk is provided between said pair of disks and one said drum, the periphery of said one other disk being shaped and proportioned such as to maintain said rods in a given shape when said rods are mounted in said holes; said rods being made of spring material and being of such free shape as to require said rods to be deformed into said given shape.

9. The program controller of claim 7, wherein said given shape in straight, and the free shape of said rods is curved.

10. A program controller, said controller having a predetermined count responsive arrangement including a counter and a count-setting means;

said counter being adapted to provide a binary representation of the value of its count, as said counter counts;

said count-setting means being adapted to be set to provide a binary representation of the value of a particular count attainable by said counter;

said counter and said count-setting means being constructed and arranged such that binary representations provided by the one thereof is in accordance with the code of FIGURE 3 hereof, and, such that the binary representations provided by the other is in accordance with the complement of said code;

readout means adapted to read out simultaneously the binary representations of said counter and the binary representations of said count-setting means; and control means responsive to the simultaneous readout, by said readout means, of complementary binary representations to produce a useful effect;

said program controller also including program setting means adapted to be set to provide a representation of a phase of a control program;

further readout means adapted to read out the last said representation and in response to produce control effect in accordance with said last said representation and only when it reads out said last said representation;

said program setting means being responsive to said useful effect to cease providing said last said representation for readout by said further readout means;

and there being driving means adapted to cause said counter to count; whereby said control effect is produced only until such time as said control means produces said useful effect.

11. The program controller of claim 10, wherein said program setting means is adapted to be set to also provide a representation of another phase of said control program;

said count-setting means is adapted to be set to also provide a binary representation of the value of a further particular count attainable by said counter;

and each of said program setting means and said count-setting means is responsive to said useful effect to provide representations of, respectively, said another phase and said further particular count instead of, respectively, representations of the first said phase and the first said particular count.

12. The program controller of claim 11, including resetting means responsive to said useful effect to reset said counter to a predetermined count representative of the beginning of a time interval the termination of which is represented by both the actual count of said counter and the setting of said count-setting means when said useful effect is produced;

said resetting means and said counter being such that resetting of said counter requires a part of said time interval and being arranged such that said predetermined count is representative of the time of beginning said time interval plus a count corresponding to said part of said time interval.

13. The program controller of claim 10, wherein said count-setting means includes a cam having a profile defined by a single lobe followed by a double notch followed by a double lobe followed by a single notch, followed by an at least triple lobe; and said cam being movable to present to said readout means, the following parts of its profile, in reverse and forward order:

said single lobe;
said single lobe and half said double notch;
said single lobe and all said double notch;
said single lobe, all said double notch and half said double lobe;
all said double notch and all said double lobe;
half said double notch, all said double lobe, and said single notch;
all said double lobe, said single notch, and one part of said at least triple lobe;
half said double lobe, said single notch, and two parts of said at least triple lobe;
and said single notch and three parts of said at least triple lobe;

said readout means having four reading elements positioned in a single line such that the first thereof reads the presence of said single lobe and the others nothing at all, for the first said of said parts;

such that the second thereof reads the presence of said single lobe and the others nothing at all, for the second said of said parts;

such that the third thereof reads the presence of said single lobe and the others nothing at all, for the third said of said parts;

such that the fourth thereof reads the presence of said single lobe, the said first thereof reads the presence of said half of said double lobe, and the others nothing at all, for the fourth said of said parts;

and so on for the remainder of said parts;

said lobes and notches being so proportioned that equal successive increments of movement of said cam, past said readout means, present said parts to said readout means in the above said order.

14. A predetermined count responsive arrangement including a counter and a count-setting means;

said counter being adapted to provide a binary representation of the value of its count, as said counter counts;

said count-setting means being adapted to be set to provide a binary representation of the value of a particular count attainable by said counter;

said counter and said count-setting means being constructed and arranged such that binary representations provided by the one thereof is in accordance with the code of FIGURE 3 hereof, and, such that the binary representations provided by the other is in accordance with the complement of said code;

readout means adapted to read out simultaneously the binary representations of said counter and the binary representations of said count-setting means;

and control means responsive to the simultaneous readout, by said readout means, of complementary binary representations to produce a useful effect.

15. The predetermined count responsive arrangement of claim 14, wherein said count-setting means includes a cam having a profile defined by a single lobe followed by a double notch followed by a double lobe followed by a single notch, followed by an at least triple lobe; and said cam being movable to present to said readout means, the following parts of its profile, in reverse and forward order:

said single lobe;
said single lobe and half said double notch;
said single lobe and all said double notch;
said single lobe, all said double notch and half said double lobe;
all said double notch and all said double lobe;
half said double notch, all said double lobe, and said single notch;
all said double lobe, said single notch, and one part of said at least triple lobe;
half said double lobe, said single notch, and two parts of said at least triple lobe;
and said single notch and three parts of said at least triple lobe;
said readout means having four reading elements positioned in a single line such that the first thereof reads the presence of said single lobe and the others nothing at all, for the first said of said parts;
such that the second thereof reads the presence of said single lobe and the others nothing at all, for the second said of said parts;
such that the third thereof reads the presence of said single lobe and the others nothing at all, for the third said of said parts;
such that the fourth thereof reads the presence of said single lobe, the said first thereof reads the presence of said half of said double lobe, and the others nothing at all, for the fourth said of said parts;
and so on for the remainder of said parts;
said lobes and notches being so proportioned that equal successive increments of movement of said cam, past said readout means, present said parts to said readout means in the above said order.

16. In combination, time generator means including first cam means operable so as to have $n$ different profiles which it can assume, one at a time, each profile being assumed but once in every $n$ times, and the $n$ different profiles appearing in a given unchanging order;

time setting means including second cam means operable so as to have $n$ different profiles which it can assume, one at a time;

readout means arranged to read out each profile assumed by the several cam means, when and as such profiles are assumed, so that at any moment said readout means is reading out a pair of assumed profiles, one for each of said several cam means;

said readout means being responsive to the shape of each such assumed profile to provide a binary representation uniquely descriptive thereof, and also being responsive to the simultaneous occurrence of mutually complementary binary representations to produce a useful effect;

said several cam means profiles being so shaped that each of the $n$ profiles of said second cam means complements but one of the $n$ profiles of said first cam means, and each of the latter profiles is complemented by but one of the profiles of said second cam means.

17. The invention of claim 16, wherein the said several cam means are profiled in accordance with FIGURE 3 hereof.

18. In a program controller constructed and arranged to be set to exercise a control action at a given instant of time, time setting means including a lobed and notched cam, and there being a plurality of elements displaceable by lobes of said cam, said cam being movable through $n+1$ positions in each of which a different configuration of cam lobes and notches is presented to said elements, each such configuration defining a binary representation of one of said positions, and each configuration being different from the others.

19. The invention of claim 18, wherein $n=9$ and there are four elements alined with one position of said cam, the spacing, number, relative position and dimensioning of said lobes and notches being such that if said cam is moved successively from said position through the remaining $n$ positions, in each said position a different number of elements will be displaced and/or different ones of said elements will be displaced.

20. The invention of claim 18, wherein said controller includes a rod, and said cam includes a sleeve-like member of sufficient length to obscure a lengthwise portion of the rod's surface, there being a line of numerical indicia along the said rod's surface, including said lengthwise portion; said indica being $n+1$ in number, and so located that when said sleeve-like member is positioned on said rod at a place corresponding to one of said $n+1$ positions, then an indicium corresponding to said one of said $n+1$ positions is exposed, whereas said member obscures the indicia, if any, next the said indicium on one side thereof.

21. The invention of claim 18, wherein said controller includes a rod, and said cam includes a sleeve-like member of sufficient length to obscure a lengthwise portion of the rod's surface, there being a line of numeral indicia along the said rod's surface, including said lengthwise portion; said indicia being $n+1$ in number, and so located that when said sleeve-like member is positioned on said rod at a place corresponding to one of said $n+1$ positions, then an indicium corresponding to said one of said $n+1$ positions is exposed, whereas said member obscures the indicia, if any, next the said indicium on one side thereof, there being a line of notches along one of said member and said rod, and a stop on the other thereof, projecting into one of said notches, said stop being releasable from said notch to permit the said member being slid to a position wherein said stop can project into another of said notches, the distance between any next adjacent pair of notches being the same as the distance between any pair of said $n+1$ positions.

22. In a program controller constructed and arranged to be set to exercise a control action at a given instant of time, including cam means and displaceable elements actuatable by cam means at such given instant, and including mechanism moving said cam means into actuating relation with said elements, there being a removable rod in said mechanism and displaceable bodily by said mechanism transverse to the length of said rod, and said cam means being mounted on said rod; said mechanism having a first part securing one end of said rod, a second part securing the other end of said rod, and a third part abutting the rod intermediate the length thereof, said parts being arranged to fit a given lengthwise-contour of said rod, and said rod having an actual lengthwise contour differing from the said given lengthwise contour and being elastically deformable to have said given lengthwise contour.

23. The invention of claim 22, wherein said first part has a socket therein, and said second part has a socket therein, each said socket facing the other and being dimensioned to fit an end of said rod and being of sufficient depth that the distance between the bottoms of said sockets is greater than the length of said rod, the first said distance less the combined depth of the sockets being less than the length of said rod, and means maintaining said rod in a position wherein each end thereof has a portion in a said socket.

24. The invention of claim 22, wherein said first part has a socket therein, and said second part has a socket therein, each said socket facing the other and being dimensioned to fit an end of said rod and being of sufficient depth that the distance between the bottoms of said sockets is greater than the length of said rod, the first said distance less the combined depth of the sockets being less than the length of said rod, and means maintaining said rod in a position wherein each end thereof has a portion in a said socket, the last said means being a spring in one said socket forcing the corresponding end of said rod away from the bottom of said one said socket, the other end socket having its bottom at such distance from the bottom of said one said socket that the corresponding end of the rod abuts the bottom of said other said socket, while the other end thereof is spaced from the bottom of the said one said socket by a distance less than the depth of said one said socket.

25. In a program controller constructed and arranged to be set to exercise a control action at a given instant of time, including cam means and displaceable elements actuatable by said cam means at such given instant, and including mechanism moving said cam means into displacement relation with said elements, said mechanism including a rotatable drum, said drum including a plurality of disks, a rotatable shaft, and a plurality of rods; a pair of said disks being end disks fixed to said shaft so that their peripheries lie radially of the axis of rotation of said shaft, one end of each of said rods being secured to the peripheral portion of one of said pair of disks, the other end of each of said rods being secured to the peripheral portion of the other of said pair of said disks, the arrangement being that the lengths of said rods lie parallel to the said axis of rotation, and each of said rods being spaced from said axis of rotation by substantially the same radial distance; another of said disks being fixed to said shaft, between and spaced from each of said pair; the said another disk being constructed and arranged so that its periphery extends to the said rods and so that it maintains said rods in parallelism with said axis of rotation, said cam means being mounted on various of said rods and between said disks, and said elements lying adjacent said cylinder close enough thereto that if cam means, whose axial position relative to shaft corresponds to the position of one of said elements, is rotated by said drum far enough, it will displace said one of said elements.

26. The invention of claim 25, wherein said cam means provides a plurality of cams, each of which is slidably mounted on said rods and between said disks, the dimensions of said cams along said rods being less than the distance between the next-adjacent disks, and said elements being positioned so that when corresponding cams are slid toward one next-adjacent disk, rotation of said drum will cause said elements to be displaced by the corresponding cams, whereas if said cams are slid toward the other next-adjacent disk, the corresponding elements will be missed by said cams as said drum rotates.

References Cited
UNITED STATES PATENTS

| | | | |
|---|---|---|---|
| 3,333,121 | 7/1967 | Ross | 307—141.8 |
| 3,324,257 | 6/1967 | Carsten | 200—37 |
| 3,168,725 | 2/1965 | Neer | 340—172.5 |
| 3,162,777 | 12/1964 | Weber et al. | 307—141.4 |
| 3,138,724 | 6/1964 | Wood | 307—141 |
| 3,040,228 | 6/1962 | Hauser | 318—443 |
| 3,036,229 | 5/1962 | Kemp et al. | 307—115 |
| 3,034,033 | 5/1962 | Fath et al. | 318—467 |
| 2,163,647 | 6/1939 | Ware | 171—119 |
| 2,288,019 | 6/1942 | Newman et al. | 250—40 |
| 1,130,091 | 3/1915 | Landis | 307—141.8 |

ROBERT C. BAILEY, *Primary Examiner.*

GARETH D. SHAW, *Examiner.*